Oct. 21, 1952  J. FRYE  2,615,113
HEAT-SEALING TOOL
Filed Nov. 24, 1947  3 Sheets-Sheet 1
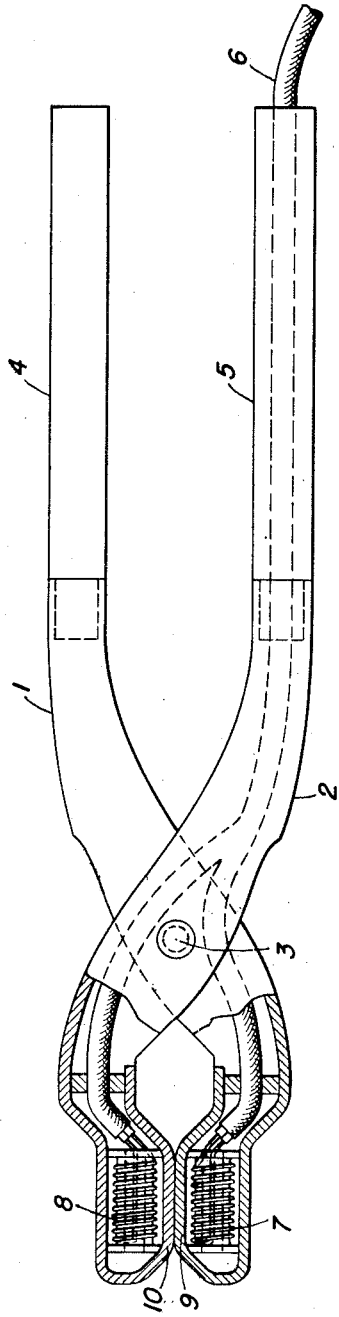
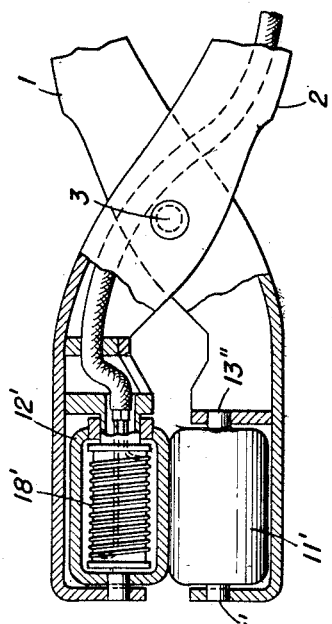
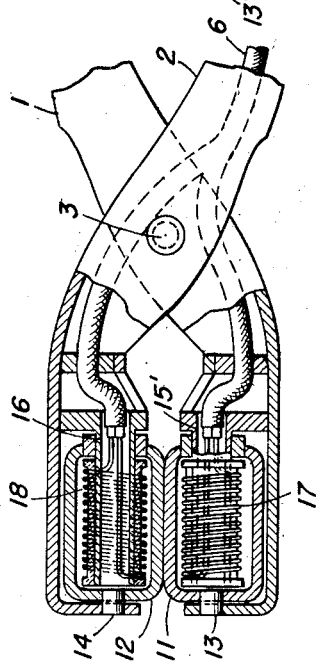
INVENTOR.
Jack Frye
BY
Donald F. McCarthy
ATTORNEY Oct. 21, 1952 J. FRYE 2,615,113
HEAT-SEALING TOOL
Filed Nov. 24, 1947 3 Sheets-Sheet 2
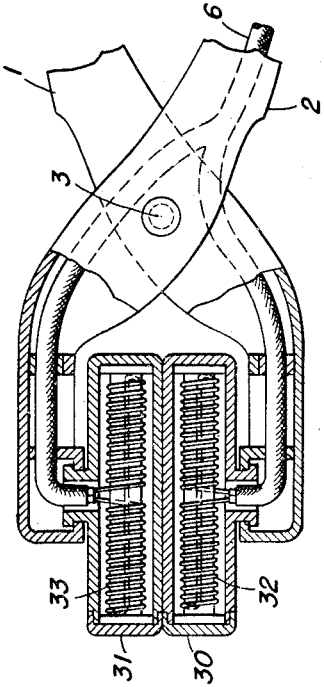
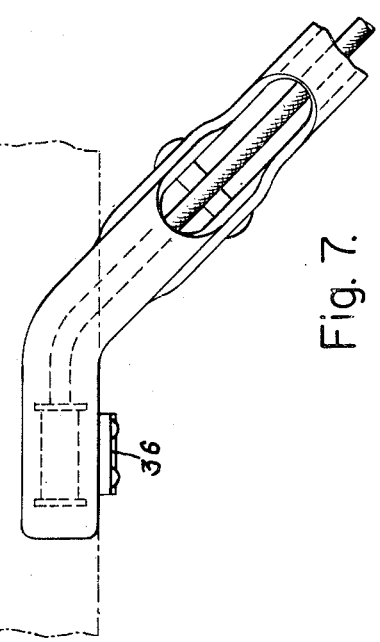
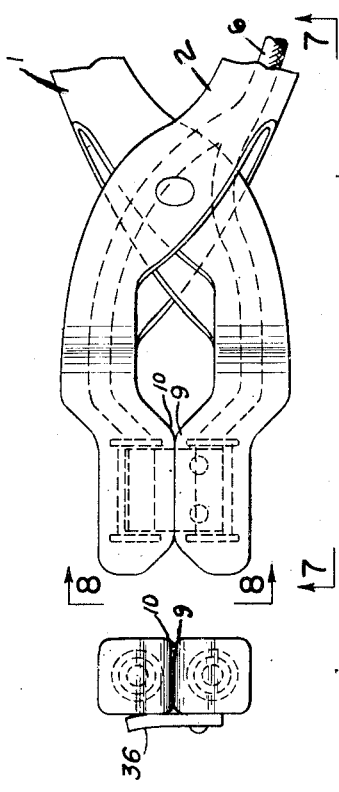
INVENTOR.
Jack Frye
BY
Donald F. McCarthy
ATTORNEY Oct. 21, 1952 J. FRYE 2,615,113
HEAT-SEALING TOOL
Filed Nov. 24, 1947 3 Sheets-Sheet 3
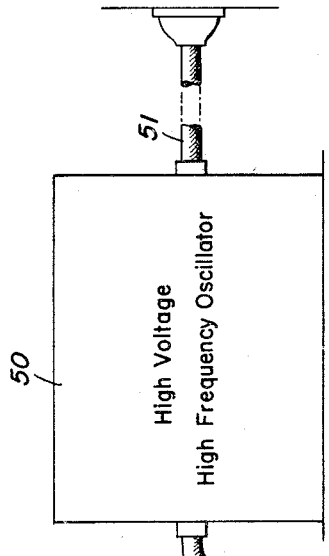
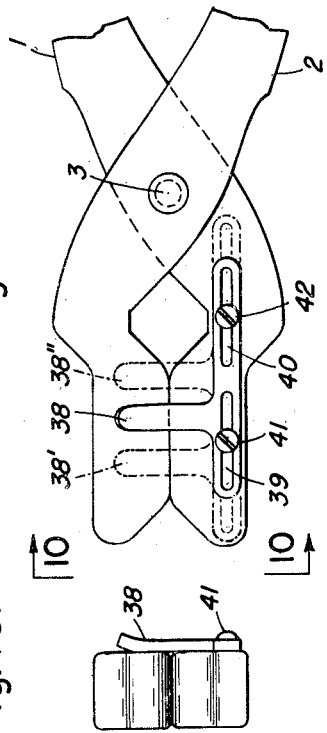
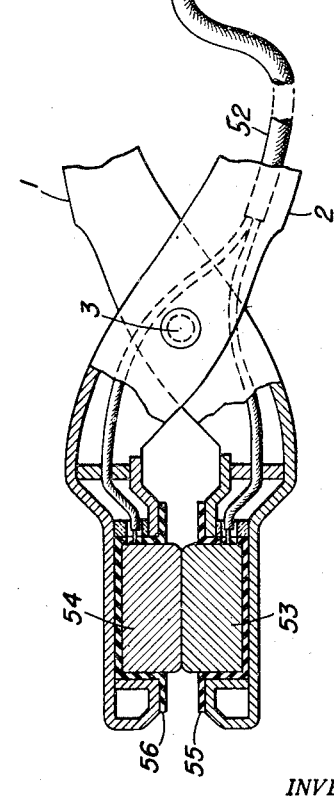
INVENTOR.
Jack Frye
BY
Donald F. McCarthy
ATTORNEY Patented Oct. 21, 1952

2,615,113

UNITED STATES PATENT OFFICE 2,615,113

HEAT-SEALING TOOL

Jack Frye, Sedona, Ariz.

Application November 24, 1947, Serial No. 787,801

3 Claims. (Cl. 219—21)

This invention relates to heat-sealing devices and more particularly to simple household or office tools for effecting a union between two or more layers of sheet or similar material by fusion of a thermoplastic material.

Numerous thermoplastic materials in sheet form have come into widespread use as wrapping, covering or packing materials. As examples of such thermoplastic wrapping or packaging materials may be mentioned regenerated cellulose, rubber hydrochloride, plasticized polyvinyl chloride, vinyl chloride-vinylidene chloride interpolymers and the like in flexible sheet form. In addition to sheets of these thermoplastic materials, such flexible sheet materials as paper or cloth either coated or impregnated with thermoplastic heat-sealable materials of the type mentioned or provided with a sealing strip of such heat-sealable material, either as a coating at its marginal edges or a separate strip inserted between the surfaces to be joined are also extensively used. These thermoplastic heat-sealable materials are used extensively in such applications as bags for food storage, particularly in refrigerators, deep freeze units and ice boxes; garment bags for the protective storage of clothing, particularly woolens; book covers for temporarily or permanently protecting the covers of books, notebooks, photographs and the like.

The use of such plastic sheet material for the various wrapping or covering purposes exemplified above frequently involves effecting a union between two or more layers of the thermoplastic material. Thus, in preparing food for freezing, the food is commonly packed in a bag made of thermoplastic sheet material or provided with a sealing strip of such material at its open end, and the open end of the bag sealed by pressing together and heating the edge portions thereof. This heating softens the thermoplastic material so that the edges are joined in a continuous fused seam. This gas-tight and moisture-proof seam or seal prevents odors originating with the food contained in the bag from escaping into the storage space and contaminating other materials therein and at the same time preserves the quality of the material stored in the bag by preventing contamination of it. In the case of garment bags, to refer to another typical example, the edges surrounding the opening through which the garment, or such articles as blankets have been inserted into the bag, must be sealed primarily to prevent moths or dust from entering the bag and attacking or soiling the articles stored therein. In this instance, a continuous seam may be employed or if it is unnecessary that an absolutely air-tight joint be formed, the edges of the material at the opening may be merely tacked at spaced intervals.

A number of devices have been suggested in the prior art for effecting the sealing of the thermoplastic wrapping materials, but all of the devices which have heretofore been developed have been designed for industrial or commercial application rather than for home or office use and therefore utilize bulky and costly equipment. The use of these prior art devices in the home is generally not justified in view of the usually limited and intermittent use of such equipment for household purposes, so that the housewife has heretofore been restricted to the use of an ordinary pressing iron to effect heat-sealing of such thermoplastic materials.

It is an object of the present invention to provide sealing equipment for thermoplastic materials such as food storage or garment bags, or the like, which is sufficiently simple, inexpensive and easy to operate as to be marketable as a household utensil or office device with all the characteristics of simplicity, low price and small space consumption usually associated with articles of this kind.

It is a further object of the invention to provide sealing equipment for plastic sheet and similar material which, in spite of its low cost and extreme simplicity of operation, is capable of making uniform and homogenous seams of the air-tight variety as well as of a more intermittent, tacking type, the equipment being particularly designed for such intermittent uses as occur in the home, as distinguished from industrial practice.

A still further object of the invention is to provide sealing equipment for thermoplastic material which is operable by a housewife or an unskilled operator without there being any danger of injury from either electrical or mechanical contact with energized or moving parts of the operating mechanism.

Other objects, and the manner in which the same are attained, will become apparent as the present specification proceeds.

In order to fully understand the present invention, reference is made to the accompanying drawings, in which:

Fig. 1 is a plan view, partly in section, of a simplified plier-like form of my invention;

Fig. 2 is a plan view, partly in section, of the jaws of a modified form of the device in which the heated portion of the jaws of the pliers are rollers;

Fig. 3 is a plan view, partly in section, of the jaws of a modified form of the device illustrated in Fig. 2, wherein only one of the rollers forming the jaws of the pliers is heated;

Fig. 4 is a plan view, partly in section, of the jaws of a further modification of the device of the present invention, wherein narrow rotary heated discs are employed in the jaws of the pliers;

Fig. 5 is a plan view, partly in section, of the jaws of a modified form of pliers, wherein the heated jaws are mounted by a swivel connection so that they may be positioned at right angles to the plane of the drawing, if desired;

Fig. 6 is a plan view of the jaws of the pair of pliers of the present invention, wherein a guide shield is provided on one side of the jaws as well as a handle set at an angle relative to the edges;

Fig. 7 is a top plan view of Fig. 6;

Fig. 8 is an end view of Fig. 6;

Fig. 9 is a plan view of the jaws of a pair of pliers of the present invention, wherein a displaceable guide is provided;

Fig. 10 is an end view of Fig. 9; and

Fig. 11 is an illustration of the jaws of a pair of pliers and a diagrammatic illustration of a high frequency oscillator for effecting the heating by high frequency currents in a dielectric medium.

Referring now to Fig. 1, the device, which is in the form of a pair of pliers, has arms 1 and 2 pivoted together by pivot pin 3. The ends 4 and 5 of arms 1 and 2 respectively may be formed of insulating material or have insulation applied thereto. A double electric cord 6 supplies current to resistance heating elements 7 and 8 disposed in the jaws at the end of arms 1 and 2 respectively. The faces 9 and 10 of the jaw end of the plier arms 1 and 2 respectively should be parallel and straight, so that in operation the edges of the material to be heat-sealed may be placed between faces 9 and 10 and the jaws closed while heated by electric resistance heating elements 7 and 8, so that heat and pressure are simultaneously applied to the thermoplastic material being sealed in order to soften and fuse it together at the line of contact of faces 9 and 10, the pliers being moved along the material to form a continuous seam, if desired, or clamped together at spaced intervals in order to tack the material at desired places.

In the form of device illustrated in Fig. 2, the fixed jaw faces have been replaced by rotatable rollers 11 and 12 journaled at one end by pins 13 and 14 respectively in the outer end of arms 1 and 2 respectively and at their other end being supported by and free to rotate about fixed supports 15 and 16 respectively for heating elements 17 and 18 respectively. This device has an advantage over the fixed jaw type illustrated in Fig. 1 in that when it is desired to form a continuous seam, the rollers 11 and 12 slide more easily over the material and any danger of breaking or tearing the sheet of thermoplastic material being sealed is minimized. If desired, as illustrated in Fig. 3, only one of the rollers 12' need be heated by a resistance heater 18' while the other roller 11' may be an idler roller rotating on pins 13' and 13" journaled in the ends of the jaw of arm 1.

When a narrow edge is to be sealed or where only a thin seam is desired, it may be advantageous to construct the tool in the form illustrated in Fig. 4, wherein the rollers 21 and 22 are rotatably mounted in the jaws at the ends of arms 1 and 2 respectively, being journaled on pins 23 and 24 respectively. As illustrated in the drawings, the disc 21 is an idler disc while disc 22 is heated by resistance heating element 25 around enlarged portion 26 of disc 22, thermal insulation 27 being provided around the resistance heating element 25 in order to minimize heating of the arm 2 of the plier itself.

Another modification of the heat-sealing pliers of the present invention is illustrated in Fig. 5, wherein the heated jaws 30 and 31 are pivoted at the jaw ends of arms 1 and 2 respectively, resistance heating elements 32 and 33 being connected to electric wire 6 provided in each of the jaws. In the position shown in the drawings, a comparatively wide marginal lip of the sheet material to be sealed may be treated, contact being along the entire length of the jaws. However, if desired, the jaws may be swung to right angles to the plane of the paper and the tool then moved along the edge of the material to be sealed, so that only a relatively narrow area of contact may exist and a comparatively narrow marginal lip is sealed.

Figs. 6, 7 and 8 show a guide shield on one side of the jaws, as well as a handle set at an angle relative to the edges. This guide serves the purpose of uniformly guiding the tool along any edge to be sealed and thus maintaining a definite marginal lip during the sealing procedure. The bent handle makes it convenient to hold the tool at a suitable angle. As illustrated in the drawings, a guide plate 36 is connected to face 9 and both faces 9 and 10 are bent at an angle to the handle as illustrated in Fig. 7.

A slightly modified form of guide shield is illustrated in Figs. 9 and 10. As there illustrated, the guide shield 38 is provided with slots 39 and 40 through which pass set screws 41 and 42 respectively, so that the guide shield 38 may be adjusted, for instance, to the positions 38' or 38" so as to permit any desired width of material to be contacted.

While the edges of the pliers have been illustrated as being heated by resistance heating elements as this is the most simple form for household use, it is apparent that if desired, the heated jaws may take the form of electrodes connected to a high frequency oscillator, so that the device uses the principle of dielectric heating. This, of course, is a more elaborate and more costly form of tool, but may be useful for certain applications where it is desired to heat the material internally rather than externally without heating the jaws of the plier. Suitable apparatus of this type is illustrated diagrammatically in Fig. 11, wherein 50 designates a high voltage, high frequency oscillator connected to a suitable source of power by electric cable 51 and cables 52 supply power from the high frequency alternating current to electrodes 53 and 54 mounted in insulation 55 and 56 in the jaws at the ends of arms 1 and 2 respectively of the pliers.

It will be understood that the foregoing illustrate preferred embodiments of the present invention and that, if desired, various auxiliary devices such as thermostatic controls to regulate the heating elements, may be used therewith and various modifications and changes which may be made without departing from the spirit of this invention or the scope of the appended claims will suggest themselves to those skilled in the art.

I claim:

1. A heat-sealing tool of plier-like construction comprising a pair of crossed pivoted arms forming handles at one end and jaws at their other end, a fixed electrical heating element mounted on the jaw end of at least one of said arms, a roller mounted on said jaw, said roller having a portion of relatively large diameter forming the inner face of said jaw, and a portion of relatively small diameter surrounded by said heating element, and a roller mounted in the jaw end of said other arm and forming the inner face thereof, a journal for rotatably mounting each roller, a fixed support within the jaw, one end of said journal being mounted in a jaw end and the other on said fixed support, said rollers contacting each other when said tool is closed.

2. A heat-sealing tool of plier-like construction comprising a pair of crossed pivoted arms forming handles at one end and having the other end turned inwardly to form jaws, the jaw ends of said arms being at an angle to the said handle ends, and provided with smooth inner faces adapted to contact each other when said tool is closed, and an electrical heating element in at least one of said jaws adapted to heat the inner face thereof, and a guide element carried on the side of one of said jaws and adapted to close one side of the opening between said jaws.

3. A heat-sealing tool of plier-like construction comprising a pair of crossed pivoted arms forming handles at one end and having the other end turned inwardly to form jaws, the jaw ends of said arms being provided with smooth inner faces adapted to contact each other when said tool is closed, an electrical heating element in at least one of said jaws adapted to heat the inner face thereof, a guide element mounted on the side of one of said jaws and slidable longitudinally thereon and extending across the side of the opening between said jaws when said tool is open to thereby control the depth to which material may be inserted between said jaws.

JACK FRYE.

REFERENCES CITED

The following references are of record in the file of this patent:

UNITED STATES PATENTS

| Number | Name | Date |
|---|---|---|
| 752,141 | Chandler | Feb. 16, 1904 |
| 1,422,826 | Brown | July 18, 1922 |
| 2,160,617 | Kellner | May 30, 1939 |
| 2,343,975 | Hosfield | Mar. 14, 1944 |
| 2,400,696 | Jones | May 21, 1946 |
| 2,401,991 | Walton et al. | June 11, 1946 |
| 2,402,298 | Salfisberg | June 18, 1946 |
| 2,441,817 | Huff | May 18, 1948 |
| 2,443,749 | Stunkel | June 22, 1948 |
| 2,476,325 | Rowe | July 19, 1949 |